March 8, 1960 — G. K. PORTER, JR — 2,927,829
PNEUMATIC FLOAT WITH MERCURY RING
Filed Aug. 28, 1958

INVENTOR
GEORGE K. PORTER, JR.
BY Frank H. Borden
ATTORNEY

United States Patent Office

2,927,829
Patented Mar. 8, 1960

2,927,829

PNEUMATIC FLOAT WITH MERCURY RING

George K. Porter, Jr., Sellersville, Pa.

Application August 28, 1958, Serial No. 757,799

7 Claims. (Cl. 309—4)

This invention relates to seals between members of force or pressure-responsive devices, such as pistons within cylinders, and other constructions, pertaining particularly to a seal of such nature that it provides minimum friction, completely positive fluid-tightness, and, in the preferred case is of material of good electrical conductivity.

The usual situation with a movable piston-like element within a guiding enclosing cylinder poses mutually exclusive and generally incompatible requirements, in that normally any effort to provide the piston with a pressure-positive seal, as a concomitant increases the friction and consequent resistance to movement of the piston relative to the guiding cylinder.

It is of course obvious that there are many piston and cylinder relations to which these incompatible requirements attach, and all such are to be considered as within the scope of the invention. For illustrative and presently preferred purposes the discussion will be concerned with devices for indicating differential fluid pressures to increase their usefulness in instrument systems, by enhanced sensitivity of their responses. This, for instance, may be applied in an instrument system as a volumetric calibration device, to integrate a flow of fluid over a known length of time, the measured linear distance the piston is displaced by an unknown flow, within a precision bore cylinder. The piston and cylinder organization according to the invention provides an accurate measure of the rate of flow during that known time interval. Within the broad contemplation of the invention, the flow under consideration may be of any form of fluid, either of gas or liquid as the application to a system may require.

Other uses of the invention, among a wide range of uses, may be as differential pressure indicators; across a restriction in a flow system, wherein the piston and cylinder organization, treated as a device, becomes an instantaneous rate indicator flow meter element; when arranged with dip tubes, wherein the device becomes the element of a specific gravity indicator, or of a liquid level indicator. When the function is to be indication, this may be direct visual indication, when a transparent tube or cylinder is used, or it may be indirectly visual, in which case the cylinder would be of such material or construction as to be magnetically transparent and a small magnet is mounted on the piston, and a magnetizable "follower" external of the cylinder would continuously indicate the position of the piston in the cylinder; or it may be electrical in which magnetic or conducting properties of the sealing ring may be utilized for signalling of position.

It is among the objects of the invention; to improve piston and cylinder sealing organizations whereby the incompatible factors of minimal friction and tight sealing are reconciled; to improve seals between pistons and cylinders; to provide a piston with a retained mercury ring as an anti-friction element sealingly contacting a cylinder; to provide a piston and cyilnder with mutually contacting areas of liquid seal which simultaneously effects a hermetic seal to cause the piston to respond in position in the cylinder to differential fluid pressures incident on the piston without the frictional restraint normally incident to conventional seals; to increase the usefulness of instrument systems by enhancing the sensitivity of their response; and other objects and advantages will become more apparent as the description proceeds.

Figure 1:
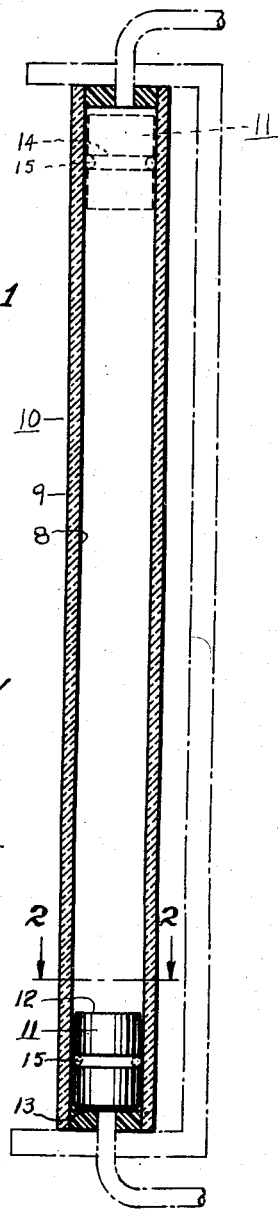
Fig. 1 represents a vertical longitudinal section through an illustrative tube showing the piston in elevation in a lower position in full lines, and showing the piston in dotted lines in an elevated position to which it has been moved in response to a fluid pressure differential on opposite end faces of the float.
Figure 3:
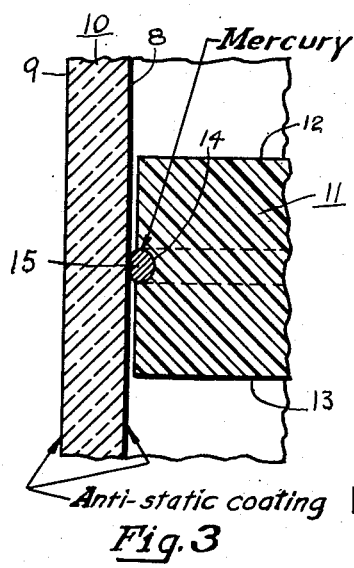
Fig. 3 represents a fragmentary section through the tube and the piston on an exaggerated scale to show the hermetic seal accomplished by the preferred mercury ring.
Figure 2:
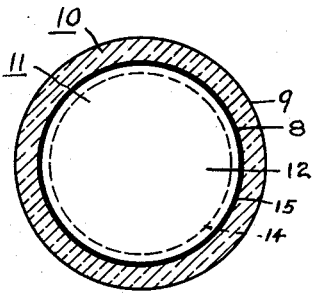
Fig. 2 represents a transverse section through the tube as taken on line 2—2 of Fig. 1, but on a more exaggerated scale.

The tube or cylinder 10 is of high accuracy and of uniform known internal diameter throughout the range of movement of the piston 11, and has an internal surface 8 and an external surface 9. The piston 11 is cylindrical, having upper and lower face ends 12 and 13, and is peripherally grooved as at 14, substantially in the center of the piston.

The cylinder 10 is of precision bore, and may be of any length, and of any suitable material, transparent or opaque, magnetically transparent or opaque, electrically conductive or insulating, metallic or non-metallic, coated, or uncoated, as the specific requirements may indicate. The piston 11 has a critical diameter relative to the diameter of the bore of the cylinder 10, to effect a more or less loose fit therein, so that it can travel therein out of actual contact with the inner surface 8 of the cylinder, while still maintaining the integrity and functioning of the liquid seal to be described. The clearance between the centered piston and the inner surface of the cylinder, substantially regardless of the actual diameters involved, is of the order at its maximum or ten-thousandths of an inch.

A liquid seal 15 is anchored in the groove 14 and extends radially of the piston far enough to contact the inner surface 8 of the cylinder throughout its peripheral extent. In the preferred form of the invention the seal 15 is comprised of mercury. The seal 15 may be mounted in the groove 14 in contact with the inner surface 8 in various ways. One is to provide an axial bore in the piston leading to lateral passages terminating in the groove 14 (not shown). A mass of the sealant is dropped into the bore and then is forced laterally into the groove 14 by pressure from a threaded plug in the bore (not shown). Another is to close one end of the cylinder and deposit the sealant on the closure and then force the piston thereagainst, forcing the sealant through the capillary space between the piston and cylinder into the groove. After a complete ring has thus been established by either method, the excess is removed, and the liquid sealant is maintained in closed encirclement of the piston in contact internally with the groove 14 and externally against the inner surface 8 of the cylinder 10. This effects a fluid tight movable seal across the annular space between the cylinder and piston.

It will be seen that when the piston is subjected to differential pressures on its opposite ends, and the same differential pressure is incident on the axially opposite surfaces of the sealant ring 15, the piston moves toward the region of lower force or pressure, and the sealant ring 15 is carried by the piston to every new position, maintaining the fluid seal.

The organization disclosed represents the optimum of various factors entering into the situation. As a generalization it may be stated that the piston has such a predetermined clearance from the precision bore, of the order not to exceed ten thousandths of an inch, having a peripheral groove of suitable depth and diameter, by a combination of the forces of cohesion and repulsion, a continuous ring of liquid is caused to be anchored in the groove, while touching and sealing the inner surface of the bore of the cylinder with such contact angle that the area of wetting of the bore is minimal, while floating the piston out of physical contact with the bore 8 of the cylinder, whereby the friction of the sealing ring liquid relative to the walls of the bore 8 is minimal, while maintaining a hermetic seal.

When the liquid ring 15 is mercury, as is preferred, this forms an optimum seal, which combines hermetic seal with minimal friction effects.

It will be understood that the mercury ring 15 retains its peripheral ring shape seated in the groove in sealing contact with the inner surface or bore 8 of the cylinder 10, by a resultant of cohesive forces in the mercury mass, and repulsive forces from the groove and cylinder surfaces. The more obvious force on the sealant is the surface-tension thereon.

In connection with the functions of the sealant ring relative to the inner surface of bore 8 of the cylinder, it will be clear that the nature of the surfaces concerned must be such that the sealant ring does not "wet" the surface of the bore 8 of the cylinder 10, nor that portion of the piston adjacent to the groove 14. Of course, in this connection, the term "wet," or its corollary "non-wet," are not absolute terms, but purely relative. A liquid in contact with a solid surface may manifest a net repulsion, as in the case of mercury against glass, water against wax, water against a smoked surface, water against a silicone-varnished surface, etc. Complementally the liquid may "wet" the solid surface and resist displacement, it may "wet" the solid surface but not be able to resist displacement by another fluid. Additionally the liquid may "wet" the solid and dissolve the solid surface. There is, therefore, no such thing as complete "non-wetting." The condition which exists at the interface between a solid and a liquid is the result of the algebraic summation of the forces of attraction and repulsion between the molecules of the two respective materials or substances. Except in the case of actual chemical interaction between the liquid and the solid, the molecular forces are the so-called Van der Waal's forces, or residual valency forces.

The degrees of "non-wetting," with which the functioning of the instant invention is concerned are defined within terms of the contact angle exhibited by a droplet of liquid resting upon a surface which it does not wet. In the case of mercury resting upon clean glass, the contact angle is of the order of 160°. In the case of water resting upon wax it is of the order of 104°.

From every consideration, including the electrical or magnetic, the optimum liquid for the seal is mercury. However it should be noted that other liquids may be used for operatively successful results. Thus water or aqueous solutions may be used if the surfaces, are, or are caused to be, water repellant, by any number of materials, including illustratively, silicone varnish, wax, carbon-coatings and the like. It is recognized that water or aqueous solutions do not have a surface tension commensurate with that of mercury, and additionally has a greater tendency to evaporate, and both of these factors would usually dictate the use of mercury, despite its higher cost and weight. Additionally, where electrical or magnetic functions are desired, mercury is indicated.

While recognizing that there is no such thing as absolute "non-wetting," so that a minimal "wetting" is inevitable, it is pointed out that this same minimal degree of wetting also should maintain as regards the surfaces of the piston. If this did not follow the liquid seal element would spread over both of the contiguous surfaces with inherent rupture of the seal between the piston 11 and the bore 8 of the cylinder 10.

While it may be preferred that the piston be formed of light weight material, this is by no means an essential. If lightness of weight is found desirable the piston may be formed of such material or may be made more or less hollow for the purpose.

It will be seen that when the piston and cylinder are disposed in vertical relation the piston is spaced axially in the cylinder so as to be centered therein, supported by the liquid seal. The organization can have a tilted relation without affecting the sealing frictionless organization. This latter because although gravitationally the piston tends toward the lower surface of the cylinder, so does the liquid seal gravitationally concentrate toward the most closely adjacent surfaces of the piston and cylinder, especially when the liquid seal is mercury.

It may be noted that with the invention controlled piston movements have been secured with smaller differential gas pressures than that required to move any of the prior art types of pistons. It seems in action as though, with an adequate but a minimum of wetted area between the mercury ring 15 and the tube surface 8 in motion of the piston there is a constantly renewed "wet" surface with rotation of some sort within the mercury. In effect the mercury forms an infinite number of ball bearings between the piston and the tube, which conduces toward the anti-friction effect of the seal.

It has been found that with ordinary glass tubing the motion of the piston in the cylinder 10 induces static charges on the tube surfaces which, if not removed, interfere with the smoothness of motion of the piston and introduces errors. A simple solution of this problem is to coat both the inner and outer surfaces 8 and 9, respectively of the cylinder 10, with a suitable anti-static coating. For illustrative purposes this may be comprised of triethylanilamine. Alternatively the tube may be formed of electro-conducting glass. As noted the tube or cylinder may be formed of suitable metal, although this may require additional equipment for sensing the piston position.

The piston itself may be formed of any material which has dimensional stability. Preferably it is formed of a thermoplastic resin.

I claim as my invention:

1. In combination a cylinder disposed in the cylinder, liquid seal means between the piston and cylinder whereby when the cylinder is generally vertical the piston is centered by the liquid seal means so as to be out of contact with the cylinder except by the common liquid seal.

2. In combination, a cylinder having an internal bore, a piston of smaller diameter than said internal bore, a ring of mercury between said piston and bore establishing an anti-friction hermetic seal therebetween.

3. The combination of claim 2, in which the piston has a peripheral groove and said ring is anchored in said groove.

4. In combination, a cylinder having an internal bore, a piston of smaller diameter than said bore having a peripheral groove, a peripherally continuous ring of mercury mounted in said groove, the spacing between said piston and said bore being such that under all of the forces acting on the ring of mercury the integrity of the latter is maintained while effecting a minimal wetting of the surface of the bore maintained during piston movements.

5. In combination a cylinder, a piston movable in the cylinder, and a liquid seal between the piston and cylinder, in which the said liquid seal has a non-wetting quality equivalent to that of mercury on glass.

6. In combination a cylinder having an internal bore, a cylindrical piston having a fixed external cylindrical surface of smaller diameter than said bore and disposed for movement axially of said bore, said piston having a peripheral groove in said external surface generally arcuate in section with the widest portion of the groove axially of the piston in said external surface, a peripherally continuous ring of liquid generally curvilinear in section partially in said groove and partially outwardly beyond said outer surface in contact with said bore, whereby the ring is anchored in the piston during relative piston and cylinder movements with maintenance of a seal between the piston and cylinder comprised solely of said liquid.

7. The combination of claim 6 in which the ring of liquid is mercury.

References Cited in the file of this patent
UNITED STATES PATENTS 2,211,456   Caldwell _____ Aug. 13, 1940

UNITED STATES PATENT OFFICE
CERTIFICATE OF CORRECTION

Patent No. 2,927,829                                               March 8, 1960

George K. Porter, Jr.

It is hereby certified that error appears in the printed specification of the above numbered patent requiring correction and that the said Letters Patent should read as corrected below.

Column 4, line 48, after "cylinder", first occurrence, insert -- , a piston --.

Signed and sealed this 4th day of October 1960.

(SEAL)
Attest:

KARL H. AXLINE
Attesting Officer

ROBERT C. WATSON
Commissioner of Patents